United States Patent [19]
Noguchi et al.

[11] 3,929,903
[45] Dec. 30, 1975

[54] GERMICIDAL AND FUNGICIDAL DIPHENYL ETHERS

[75] Inventors: Teruhisa Noguchi; Yoshinobu Hashimoto, both of Fujisawa; Yoshio Uchiyama, Takaoka; Michio Ueyama, Tokyo, all of Japan

[73] Assignee: Nippon Soda Company, Ltd., Tokyo, Japan

[22] Filed: July 26, 1974

[21] Appl. No.: 492,151

Related U.S. Application Data

[62] Division of Ser. No. 344,446, March 23, 1973, abandoned.

[52] U.S. Cl....... 260/613 R; 260/429.9; 260/479 R; 260/476 R; 260/473 G; 260/520; 260/456 P; 260/951; 260/931; 260/938; 424/218; 424/340; 424/217; 424/289; 424/300; 424/309; 424/311; 424/315; 424/317; 424/341
[51] Int. Cl.² .......................................... C07C 43/22
[58] Field of Search ................................ 260/613 R

[56] References Cited
UNITED STATES PATENTS

| | | |
|---|---|---|
| 1,932,595 | 10/1933 | Muth et al. ..................... 260/613 R |
| 3,405,184 | 10/1968 | Widiger et al. ................. 260/613 R |
| 3,417,146 | 12/1968 | Linn et al. ..................... 260/613 R X |
| 3,506,720 | 4/1970 | Model et al. ..................... 260/613 R |
| 3,753,914 | 8/1973 | Berth et al. ..................... 260/613 R X |

*Primary Examiner*—Bernard Helfin
*Attorney, Agent, or Firm*—George B. Oujevolk

[57] ABSTRACT

A germicidal and fungicidal agent which is composed of a specific novel diphenyl ether compound represented by a following general formula

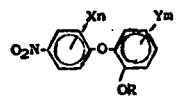

which is characterized by excellent germicidal and fungicidal activity and less toxicity. The compound can be used for ingredient of a sterilizing agent, an antiseptic detergent composition, a slime control agent and a fungus inhibitor for plastics.

4 Claims, No Drawings

GERMICIDAL AND FUNGICIDAL DIPHENYL ETHERS

This is a division of application Ser. No. 344,446 filed Mar. 23, 1973, and now abandoned.

Title of the invention

Germicidal and fungicidal agent and use thereof

DETAILED EXPLANATION OF THE INVENTION

This invention relates to a germicidal and fungicidal agent, more particularly relates to a germicidal and fungicidal agent containing specific diphenyl ether compounds and further this invention concerns with a method controlling germ and fungi.

The increasing use in recent decades of various antibiotics has been countered in nature by the emergence of antibiotic resistant strains of bacteria and unexpected harmful effect come from contamination with food or drinks became big social problem. Consequently, there is an increased need to chemical compound which has sufficient action on killing germs and fungi. However, some of the ingredients being used in the above purpose, on the one hand, have excellent effect but, on the other hand, harm human skin or eyes. On the contrary, some of less although have less toxicity, their germicidal and fungicidal activity are not satisfactory.

Thus, it is an object of this invention to provide a germicidal and fungicidal agent which has excellent activity and non-toxicity. It is a further object to provide a method controlling germs and fungi. Another object of this invention is to provide toilet materials having excellent germicidal effect, which contains the agent aforementioned. Further object of the invention is to provide an additive for plastics which prevents from the growth of germs or fungi. Additional object is to provide slime controlling agent for paper manufacturing process. A still further object will be clarified hereinafter.

Briefly stated, the present invention is based upon the discovery that the new diphenyl ether compound represented by the following general formula [1] has excellent germicidal and fungicidal activities without any human and mammalian toxicity.

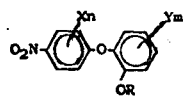

(1)

wherein X is selected from the group consisting of halogen atom, hydroxy and lower alkyl group; Y is halogen atom or atoms and when m is plural number, Y may consist of different kind of halogen atoms; R is selected from the group consisting of hydrogen atom, sodium atom, zinc atom (½ Zn), aliphatic acyl,

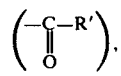

substituted or non-substituted aromatic acyl

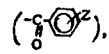

alkoxy carbonylmethyl ($-CH_2COOR''$), hydroxycarbonylmethyl ($-CH_2COOH$), alkali metal salt of hydroxycarbonylmethyl ($-CH_2COOH$), tosyl

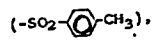

chloromethanesulfonyl ($-SO_2CH_2Cl$), dihydroxyphosphinyl ($-PO(OH)_2$), alkali metal salt of dihydroxyphosphinyl ($-PO(OM)_2$), dialdoxyphosphinyl ($-PO(OR''')_2$) dialkoxythiophosphinyl ($-PS(OR'')_2$) and alkylcarbamoyl ($-CONHR''''$); $n$ expresses 0 or 1, $m$ expresses 0 or integer of not more than 3 and exclude the case either $m$ and $n$ are 0.

In the above, the term of alkyl means an alkyl group having less than 4 carbon atoms and particularly methyl radical is preferable. Although halogen atoms represented by the symbol Y shoud not be limited specific species, chlorine atom is most preferable. Z expresses hydrogen, halogen or methyl group.

Although various kind of compounds had been proposed as germicide or fungicide, we have to emphasize that the compound of the present invention is characterized by furnishing both excellent activity and extremely low toxicity.

The compounds represented in the general formula (I) can be prepared by in accordance with one of the processes presented by the following chemical equations.

i. when $R=CH_3$, X=lower alkyl group or hydrogen atom

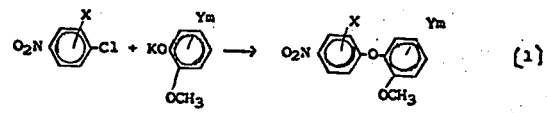

ii. when X=Y=halogen atom

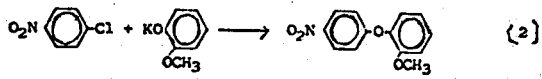

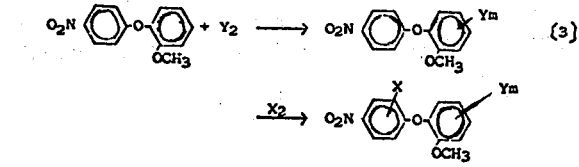

iii. when X=—OH and R=H

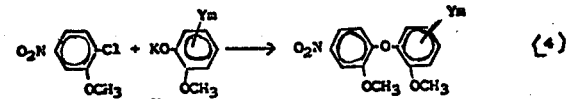

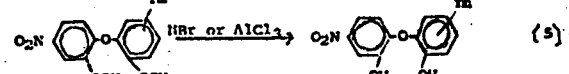

iv. when R=H

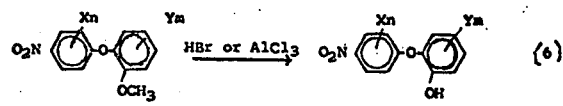

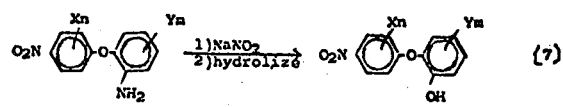

or v. when R is a substituting group

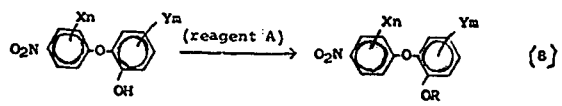

(8)

Reagent A is settled according to the species of substituting group and their examples are illustrated in Table 1.

Table 1

| No. | Substituting group | Reagent A |
| --- | --- | --- |
| 1 | Na | NaOH |
| 2 | ½ Zn | NaOH, ZnCl$_2$ |
| 3 | —COR' | O(COR')$_2$ or ClCOR' |
| 4 | -CO-⟨ ⟩-Z | ClCO-⟨ ⟩-Z |
| 5 | —CH$_2$COOR'' | ClCH$_2$COOR'' or ClCH$_2$COOH and R''OH |
| 6 | —CH$_2$COOH | ClCH$_2$COOH |
| 7 | —SO$_2$-⟨○⟩-CH$_3$ | ClSO$_2$-⟨○⟩-CH$_3$ |
| 8 | —SO$_2$CH$_2$Cl | ClSO$_2$CH$_2$Cl |
| 9 | —PO(OR''')$_2$ | ClPO(OR''')$_2$ |
| 10 | —PS(OR''')$_2$ | ClPS(OR''')$_2$ |
| 11 | —PO(OH)$_2$ | POCl$_3$ |
| 12 | —CONHR'''' | R''''NCO |

The reaction illustrated in the equations [1], [2] and [4] can be carried out by reacting substituted or non-substituted p-nitro chlorobenzene with potassium salt of quaiacol under the presence of polar solvent such as acetone, acetic acid, dimethyl formamide and dimethyl sufoxide. The halogenation reaction in the equation [3] can be easily performed by conventional process. The demethylation reaction illustrated in the equations [5] and [6] may be performed by heating 2-methoxy-4'-nitrodiphenyl ethers provided by the method of equation [1] or [4] with hydrobromic acid or its mixture with acetic acid. Another method for demethylation consists of heating 2-methoxy-4'-nitrodiphenyl ethers together with aluminium chloride in benzene. The reaction in the equation [7] can be carried out by diazotizing the corresponding 2-amino-4'-nitrodiphenyl ethers and successively hydrolyzing the resulting diazonium salt with aqueous acid.

The compounds having alkali metal atom in the position of symbol R (Table 1, No. 1) can be prepared by treating 2-hydroxy-4'-nitro diphenyl ethers with caustic alkali or alkali metal alkolate. The compound having light metal atom in the position of symbol R (No. 2) can be obtained by reacting the above 2-sodium oxy-4'-nitrodiphenyl ethers with chloride of light metal. Typical example of the chloride of light metal is zinc chloride. The compounds having substituting group represented by No. 3, 4, 5, 6, 9 and 10 in Table 1 can be provided by reacting 2-hydroxy-4'-nitrodiphenyl ethers with chlorides or anhydride shown in Reagent A of Table 1. The reaction may be favorably carried out under existence of organic solvent such as benzene but when the reagent is acid anhydride, the solvent is not inevitable. Reaction temperature is settled at between a room temperature and a boiling point of the solvent or the reagent.

The compounds having substituting group represented by No. 7 and No. 8 of Table 1 in the possition of symbol R can be provided by reacting 2-hydroxy-4'-nitrodiphenyl ethers with corresponding sulfonylchlorides in presence of benzene, acetone, alcohol or ether at the temperature of between 10°C and boiling point of the employed organic solvent for 0.5 ~ 10 hrs.

The compounds having dihydroxyphosphinyl group in the position of symbol R can be provided by such method that 2-hydroxy-4'-nitrodiphenyl ether is made to react with phosphorus oxychloride in presence of small amount of sodium chloride for 1 ~ 20 hrs and, after removing the unreacted phosphorus oxychloride, the residual mixture is hydrolyzed by water or aqueous caustic alkali.

Further, the compound having carbamoyl group can be provided by the reaction between 2-hydroxy-4'-nitro diphenyl ethers and alkylisocyanate.

Typical diphenyl ether compounds of the present invention are illustrated in Table 2.

Table 2

| No. | Structural Formula | Chemical Name | Melting Point or Refractive Index |
| --- | --- | --- | --- |
| I | O$_2$N-⟨○⟩-O-⟨○⟩-Cl (OH) | 4-Chloro-2-hydroxy-4'-nitro-diphenyl ether | m.p. 121~122.5 |
| II | O$_2$N-⟨○⟩-O-⟨○⟩-Cl (OH) | 5-Chloro-2-hydroxy-4'-nitrodiphenyl ether | m.p. 94~94.5 |
| III | O$_2$N-⟨○⟩-O-⟨○⟩-Cl (O-CCH$_3$, ‖O) | 2-Acetoxy-4-chloro-4'-nitrodiphenyl ether | m.p. 85~87.5 |
| IV | O$_2$N-⟨○⟩-O-⟨○⟩-Cl (O-CCH$_3$, ‖O) | 2-Acetoxy-5-Chloro-4'-nitrodiphenyl ether | m.p. 62~63 |

Table 2-continued

| No. | Structural Formula | Chemical Name | Melting Point or Refractive Index |
| --- | --- | --- | --- |
| V | $O_2N$-◯-O-◯-Cl, O-C(=O)-$C_2H_5$ | 4-Chloro-4-nitro-2-propionoyl-oxydiphenyl ether | m.p. 75~77 |
| VI | $O_2N$-◯-O-◯-Cl, O-C(=O)-$C_3H_7$ | 2-Butyroyloxy-4-chloro-4'-nitrodiphenyl ether | R.I. $n_D{}^{17}$=1.5790 |
| VII | $O_2N$-◯-O-◯-Cl, O-C(=O)-◯ | 2-Benzoyloxy-4-chloro-4'-nitrodiphenyl ether | m.p. 68~70 |
| VIII | $O_2N$-◯-O-◯-Cl, O-C(=O)-◯-Cl | 2-(p-chlorobenzoyloxy)-4-chloro-4'-nitrodiphenyl ether | m.p. 86~87 |
| IX | $O_2N$-◯-O-◯-Cl, ONa | Sodium 5-chloro-2-(4-nitrophenoxy)phenoxide | m.p. 120~123 (decompose) |
| X | $O_2N$-◯-O-◯-Cl, OZn 1/2 | Zinc 5-chloro-2-(4-nitrophenoxy)phenoxide | m.p. 162~165 (decompose) |
| XI | $O_2N$-◯-O-◯(Cl,Cl,Cl), OH | 2-Hydroxy-4'-nitro-3,4,5-trichlorodiphenyl ether | m.p. 147~149 |
| XII | $O_2N$-◯-O-◯(Cl,Cl,Cl), O-C(=O)-$CH_3$ | 2-Acetoxy-4'-nitro-3,4,5-trichlorodiphenyl ether | m.p. 92.5~95 |
| XIII | $O_2N$-◯-O-◯(Cl,Cl), OH | 4,5-Dichloro-2-hydroxy-4'-nitrodiphenyl ether | m.p. 123~124 |
| XIV | $O_2N$-◯-O-◯(Cl,Cl), O-C(=O)-$CH_3$ | 2-Acetoxy-4,5-dichloro-4'-nitrodiphenyl ether | m.p. 83~84 |
| XV | $O_2N$-◯-O-◯-Cl, O-$CH_2$-C(=O)-$OCH_3$ | Methyl 5-chloro-2-(4-nitrophenoxy)-phenoxyacetate | m.p. 74~78 |
| XVI | $O_2N$-◯-O-◯-Cl, O-$CH_2$-C(=O)-OH | 4-Chloro-2-(4-nitrophenoxy)-phenoxyacetic acid | m.p. 100~103 |

Table 2-continued

| No. | Chemical Name | Melting Point or Refractive Index |
|---|---|---|
| XVII | Potassium 5-chloro-2-(4-nitro-phenoxy)phenoxyacetic acid | m.p. 200 up |
| XVIII | 4-Bromo-5-chloro-2-hydroxy-4'-nitrodiphenyl ether | m.p. 132.5~134.5 |
| XIX | 5-Bromo-4-chloro-2-hydroxy-4'-nitrodiphenyl ether | m.p. 136~138.5 |
| XX | 5-Chloro-2-(4-nitrophenoxy)phenyl-phosphorate tetrahydrate | m.p. 137~139 |
| XXI | Disodium 5-chloro-2-(4-nitrophenoxy)-phenyl phosphorate | m.p. 141~142 (decompose) |
| XXII | 4-Chloro-4'-nitro-2-tosyloxy-diphenyl ether | m.p. 115.5~117.5 |
| XXIII | 4-Chloro-2-(chloromethanesulfonyl-oxy)-4'-nitrodiphenyl ether | m.p. 129.5~131.5 |
| XXIV | O,O-Dimethyl 5-chloro-2-(4-nitrophenoxy)phenyl-phosphorothioate | R.I. $n_D^{18}$;1.5946 |
| XXV | 4-Chloro-4'-nitro-2-(methyl-carbamyl)diphenyl ether | m.p. 129.5~131.5 |
| XXVI | 4,5-Dichloro-4'-nitro-2-tosyloxydiphenyl ether | m.p. 160~161 |
| XXVII | O,O-Dimethyl 4,5-dichloro-2-(4-nitrophenoxy)phenyl-phosphorothioate | m.p. 156~157.5 |
| XXVIII | 4,5-Dichloro-4'-nitro-2-(methylcarbamyl)diphenyl ether | m.p. 120~121.8 |
| XXIX | 2-(Chloromethanesulfonyloxy)-4,5-dichloro-4'-nitrodiphenyl ether | m.p. 137~139 |

Table 2-continued

| No. | Structural Formula | Chemical Name | Melting Point or Refractive Index |
|---|---|---|---|
| XXX | | 4,2'-Dichloro-2-hydroxy-4'-nitrodiphenyl ether | m.p. 100~102 |
| XXXI | | 5,2'-Dichloro-2-hydroxy-4'-nitrodiphenyl ether | m.p. 116~117 |
| XXXII | | 2-Chloro-2'-hydroxy-4-nitrodiphenyl ether | m.p. 62~65 |
| XXXIII | | 2-Acetoxy-4,2'-dichloro-4'-nitrodiphenyl ether | R.I. $n_D^{26.5}$:1.5640 |
| XXXIV | | 4,2'-Dichloro-4'-nitro-2-tosyloxydiphenyl ether | m.p. 100~101 |
| XXXV | | 5-Chloro-2-hydroxy-2'-methyl-4'-nitrodiphenyl ether | m.p. 81.5~84.5 |
| XXXVI | | 5-Chloro-2,2'-dihydroxy-4'-nitrodiphenyl ether | m.p. 127~128 |

The germicidal and fungicidal agent of this invention can be used for various fields and typical examples of their application are Soaps, toiletaries, sterilization for hospital use, mold inhibitor for fiber, plastics and paint, disinfection for sanitary goods and fabrics, a sterilizing and deodorant agent for drainage and a slime control agent for pulp industry.

The germicidal and fungicidal agent of this invention also can be used in various forms or formulations and typical examples are composition which contains at least one of the compounds of this invention or its mixture with other conventional germicide or fungicide, composition consisting of appropriate carrier and the compound of this invention, and solution, emulsion or dispersion consisting of solvent, the compound of this invention and surfactant, if necessary. The favorable contents of the compound in these formulations are from 0.5 to 10,000 ppm.

An antiseptic toilet composition can be provided with a mixture containing 0.01~10% by weight of the compound of this invention and synthetic toilet detergent or soap and by adding dye, perfume and other anxiliaries if necessary. They are used in any form of solid, solution emulsion or surpension.

An antiseptic composition for human waste or sewerage can be prepared by dispersing 0.1~10% by weight of the compound of this invention, pigment or dye and appropriate amount of surfactant into suitable dispersing medium, or by mixing 0.1~10% by weight of the compound of this invention, pigment or dye and appropriate carrier, and further adding deodorant, perfume and other auxiliaries if necessary.

A slime control control agent particularly suitable for paper industry can be provided by mixing 1~30% by weight of the compound of this invention, appriate amount of surfactant and medium such as water or organic solvent.

Prevention from propagation of germs or fungi on the plastic can be attained by adding 1~1000 ppm of the compound of this invention to the plastic during polymerization, compound or molding process.

The following specific examples will clarify a number of the compounds of this invention, producing process thereof, formulations or applications thereof, germicidal and fungicidal activity and toxicology thereof.

EXAMPLE 1

Preparation of 2-acetoxy-4-chloro-4'-nitrodipheyl ether (compound III).

5g of 4-chloro-2-hydroxy-4'-nitrodiphenyl ether was mixed with 3.1g of acetic anhydride and the resulting mixture, to which one drop of pyridine was added, was heated under refluxing for 10 hrs. After completing the reaction, the cooled reaction mixture was poured to ice water, neutralized by aqueous caustic soda and filtered. Dryed filter cake was recrystallized from ligroin and thus 3.1g of white crystal of 2-acetoxy-4-chloro-4'-nitro diphenyl ether having 85° – 87.5°C of melting point was obtained. (yield: 50.6%) A result of elementary analysis is as follows:

| Element | Observed | Theoretical |
|---|---|---|
| C | 54.42% | 54.65% |
| H | 3.47 | 3.28 |
| Cl | 11.03 | 11.52 |
| N | 4.23 | 4.56 |

EXAMPLE 2

Preparation of 5-bromo-4-chloro-2-hydroxy-4'-nitrodiphenyl ether (compound XIX)

4g of 4-chloro-2-hydroxy-4'-nitrodiphenyl ether was dissolved in 40g of acetic anhydride and 2.4g of bromine was gradually added to the solution followed by standing for one night at room temperature. Further, in order to complete the reaction, the solution was warmed at 50°C for 3 hrs and the product was neutralized and separated in accordance with the similar manner as in Example 1. Then 2.6g of white crystal of 5-bromo-4-chloro-2-hydroxy-4'-nitro diphenyl ether having melting point of 136°~138.5°C was provided after recrystallizing the crude product from chloroform. (yield 50.4%) A result of elementary analysis is as follows:

| Element | Observed | Theoretical |
|---|---|---|
| C | 41.81% | 41.83% |
| H | 2.03 | 2.05 |
| Cl | 10.81 | 10.29 |
| N | 3.89 | 4.07 |

EXAMPLE 3

Preparation of disodium 5-chloro-2-(4-nitrophenoxy)phenyl phosphorate. (compound XXI)

4-chloro-2-hydroxy-4'-nitrodiphenyl ether [A] was prepared by demethylation of 4-chloro-2-methoxy-4'-nitrodiphenyl ether under existence of hydrobromic acid. 26.6g of the compound [A] was mixed with 90g of phosphorus oxychloride and 0.5 of sodium chloride, and the resulting mixture was refluxed for 7 hrs. After finishing the reaction, almost of all unreacted phosphorus oxychloride was removed under reduced pressure and 300 ml of warm water was added to the residue. After a while, an oily matter was separated from a water layer and acidified by adding hydrochloric acid. Then the oily matter was dissolved into alcoholic mixture consisting of 200CC of alcohol, 50g of water and 10g of cautic soda, and the resulting solution was treated with active carbon. Solvent was removed from the filtrate under reduced pressure and thus, light yellowish crystal of disodium 5-chloro-2-(4-nitrophenoxy)phenyl phosphorates having melting point of 141°~142°C (decompose) was obtained. (yield:60%) A result of elementary analysis is as follows

| Element | Observed | Theoretical |
|---|---|---|
| C | 36.79% | 36.99% |
| H | 1.85 | 1.81 |
| Cl | 8.89 | 9.10 |
| N | 4.17 | 3.60 |
| P | 7.71 | 7.95 |

EXAMPLE 4

Preparation of 4,5-dichloro-4'-nitro-2-tosyloxy diphenyl ether (compound XXVII)

6.4g of sodium 4,5-dichloro-2-(4-nitrophenoxy) phenoxide, which was prepared by reacting sodium ethylate with 4,5-dichloro-2-hydroxy-4'-nitro-diphenyl ether, dissolued into 70 ml of anhydrous acetone and 3.8g of tosyl chloride was added dropwise gradually to the mixture at room temperature with agitation. After additional agitation for 2 hrs the reaction mixture was poured into ice water so as to solidify. Solid matter was collected by filtration and the cake was washed with water, dried and recrystallized from acetone. Thus, 3.0g of transparent yellowish scaly crystal of 4,5-dichloro-4'-nitro-2-tosyloxydiphenyl ether having 160°~161°C of melting point was obtained. (yield 30.3%) A result of elementary analysis is as follows:

| Element | Observed | Theoretical |
|---|---|---|
| C | 50.01% | 50.23% |
| H | 2.90 | 2.88 |
| Cl | 16.02 | 15.61 |
| N | 3.83 | 3.08 |
| S | 6.71 | 7.06 |

EXAMPLE 5

Preparation of methyl [5-chloro-2-(4-nitrophenoxy)phenoxy]-acetate. (compound XV)

13.3g of 4-chloro-2-hydroxy-4'-nitro diphenyl ether was added dropwise to alkolate solution composed of 100ml of anhydrous ethanal and 1.15g of metallic sodium, 5.43g of methyl chloroacetate was added to the mixture and then reflux was continued for 7 hrs. After finishing the reaction, the cooled reaction mixture was filtered and ethanol in the filtrate was removed under reduced pressure. The residue was recrystallized from ethanol and pale grayish crystal of methyl 5-chloro-2-(4-nitrophenoxy)phenoxy acetate having 74°~78°C of melting point was obtained. A result of elementary analysis is as follows:

| Element | Observed | Theoretical |
|---|---|---|
| C | 53.23% | 53.35% |
| H | 3.51 | 3.58 |
| Cl | 10.82 | 10.50 |
| N | 4.61 | 4.15 |

EXAMPLE 6

Preparation of 0,0-dimethyl-5-chloro-2-(4-nitrophonoxy)phenyl phosphorothioate (compound XXIV)

10g of 4-chloro-2-hydroxy-4'-nitrodiphenyl ether and 6.2g of potassium carbonate was dissolved in 50ml of acetone and 16g of acetone solution containing 6.6g of 0,0-dimethyl thiophosphorylchloride was gradually, added to the resulting solution. After refluxing for 2.5hrs, the reaction mixture was poured into 300 ml of ice water and the product was extracted by benzene. The extract was washed with water and dried. Then solvent was distilled off under reduced pressure. Pale yellowish oily matter of 0,0-dimethyl-5-chloro-2-(4-nitrophenoxy)phenylphosphorothioate having refractive index of $n_D^{18}$ : 1.5946 was obtained. A result of elementary analysis is as follows:

| Element | Observed | Theoretical |
|---|---|---|
| C | 43.41% | 43.14% |
| H | 3.24 | 3.36 |
| Cl | 8.98 | 9.10 |
| N | 3.83 | 3.59 |
| P | 8.19 | 7.95 |

EXAMPLE 7

Preparation of
4-chloro-4'-nitro-2-(methylcarbamyl)diphenyl ether (compound XXV)

20g of 4-chloro-2-hydroxy-4'-nitro diphnyl ether was dissolved in 100ml of benzene and after droping 1 drop of pyridine, the mixture consisting of 5.1g of methylisocyanate and 5ml of benzene was added to the resulting solution with agitation. Following by reflux for 16 hrs, the reaction mixture was concentrated and the residue was recrystallized from ethanol. Thus, slightly yellowish needle crystal of 4-chloro-4'-nitro-2(methylcarbamyl)diphenyl ether having melting point of 101°~103°C was obtained. (yield: 60%) A result of elementary analysis is as follows:

| Element | Observed | Theoretical |
|---|---|---|
| C | 52.34% | 52.11% |
| H | 3.48 | 3.44 |
| Cl | 11.31 | 10.99 |
| N | 9.04 | 8.68 |

EXAMPLE 8

Standard solutions were prepared by dissolving 20 mg of each compound listed in Table 2 into 10 ml of acetone respectively. A series of culture grounds including various concentration of the compounds of this invention were provided by placing 10 ml of meat extract solution (test for germs) or Sabouraud solution (test for fungi) in test tubes and by successively adding the above standard solution in such manner that the contents of the compound in the resulting solution were 0.5, 5, 50 and 500 ppm respectively. In case of the test for a bactericidal activity, 0.1 ml of diluted bacteria solution which was prepared by diluting 18-hour cultured fruids of Escherichia coli or Staphylococcus aureus at the rate of 1 : 100 was inoculated to each test tube and the cultured fruids were incubated at 37°C. Observation was made at 24 hrs and 48 hrs after and then minimum concentration for preventing the propagation of bacteria was investigated.

In case of the test for fungicidal activity, 0.1 ml of completely cultivated slant diluted with nutrient broth so as to contain a cell count of 10,000 per ml. and was added to every test tube and the cultured fruids were incubated at 27°C.

Observation was made after 2 days and 4 days (in case of *Candida albicans*) or after 5 days and 15 days (in case of *Trichophyton interdigitale*) and then minimum concentrations for preventing the propagation of fungi were investigated.

The results of these tests are set forth in Table 2.

Table 2

| Compound No. | Minimum concentration of effective range for preventing propagation (ppm) | | | | | | | |
|---|---|---|---|---|---|---|---|---|
| | *Candida albicans* | | *Trichophyton interdigitale* | | *Escherichia coli* | | *Staphylococcus aureus* | |
| | 2 days | 4 days | 5 days | 15 days | 24 hrs | 48 hrs | 24 hrs | 48 hrs |
| I | 50 | 50 | 0.5 | 0.5 | 0.5 | 0.5 | 0.5 | 0.5 |
| II | 50 | 50 | 5 | 5 | 0.5 | 0.5 | 0.5 | 0.5 |
| III | 50 | 50 | 0.5 | 5 | 0.5 | 0.5 | 0.5 | 0.5 |
| IV | 50 | 50 | 5 | 5 | 0.5 | 0.5 | 0.5 | 0.5 |
| V | 50 | 50 | 5 | 5 | 0.5 | 0.5 | 0.5 | 0.5 |
| VI | 50 | 50 | 5 | 5 | 5 | 5 | 0.5 | 0.5 |
| VII | 50 | 50 | 5 | 5 | 5 | 5 | 0.5 | 0.5 |
| VIII | 50 | 50 | 5 | 5 | 0.5 | 0.5 | 0.5 | 0.5 |
| IX | 50 | 50 | 0.5 | 5 | 0.5 | 0.5 | 0.5 | 0.5 |
| X | 50 | 50 | 5 | 5 | 0.5 | 0.5 | 0.5 | 0.5 |
| XI | 50 | 50 | 5 | 5 | 5 | 5 | 0.5 | 0.5 |
| XII | 50 | 50 | 5 | 5 | 50 | 50 | 0.5 | 0.5 |
| XIII | 50 | 50 | 0.5 | 0.5 | 0.5 | 0.5 | 0.5 | 0.5 |
| XIV | 50 | 50 | 0.5 | 0.5 | 0.5 | 0.5 | 0.5 | 0.5 |
| XV | 50 | 500 | 5 | 5 | 0.5 | 5 | 0.5 | 0.5 |
| XVI | 50 | 50 | 0.5 | 0.5 | 0.5 | 0.5 | 0.5 | 0.5 |
| XVII | 50 | 50 | 5 | 5 | 0.5 | 0.5 | 0.5 | 0.5 |
| XVIII | 50 | 50 | 5 | 5 | 0.5 | 0.5 | 0.5 | 0.5 |
| XIX | 50 | 50 | 5 | 5 | 0.5 | 0.5 | 0.5 | 0.5 |
| XX | 50 | 500 | 0.5 | 5 | 0.5 | 0.5 | 0.5 | 0.5 |
| XXI | 50 | 50 | 5 | 5 | 0.5 | 0.5 | 0.5 | 0.5 |
| XXII | 50 | 50 | 5 | 5 | 0.5 | 0.5 | 0.5 | 0.5 |
| XXIII | 50 | 50 | 5 | 5 | 0.5 | 0.5 | 0.5 | 0.5 |
| XXIV | 50 | 50 | 0.5 | 0.5 | 0.5 | 0.5 | 0.5 | 0.5 |
| XXV | 50 | 50 | 0.5 | 5 | 0.5 | 0.5 | 0.5 | 0.5 |
| XXVI | 50 | 50 | 5 | 5 | 0.5 | 0.5 | 0.5 | 0.5 |
| XXVII | 50 | 50 | 5 | 5 | 0.5 | 0.5 | 0.5 | 0.5 |
| XXVIII | 50 | 50 | 0.5 | 5 | 0.5 | 0.5 | 0.5 | 0.5 |
| XXIX | 50 | 50 | 0.5 | 0.5 | 0.5 | 0.5 | 0.5 | 0.5 |
| XXX | 50 | 500 | 0.5 | 0.5 | 0.5 | 0.5 | 0.5 | 0.5 |
| XXXI | 50 | 500 | 5 | 5 | 0.5 | 0.5 | 0.5 | 0.5 |
| XXXII | 50 | 50 | 5 | 5 | 0.5 | 0.5 | 0.5 | 0.5 |
| XXXIII | 50 | 500 | 5 | 5 | 0.5 | 0.5 | 0.5 | 0.5 |
| XXXIV | 50 | 50 | 0.5 | 0.5 | 0.5 | 0.5 | 0.5 | 0.5 |
| XXXV | 50 | 50 | 5 | 5 | 0.5 | 0.5 | 0.5 | 0.5 |
| XXXVI | 50 | 50 | 0.5 | 5 | 0.5 | 0.5 | 0.5 | 0.5 |
| G-11 * | 50 | 500 | | | 50 | 0.5 | 0.5 | 0.5 |
| TMTD ** | 0.5 | 5 | | | 500 | 5 | 5 | 5 |
| Chloromycetin | — | — | — | — | 5 | 5 | — | — |

Table 2-continued

| Compound No. | Minimum concentration of effective range for preventing propagation (ppm) | | | | | | | |
|---|---|---|---|---|---|---|---|---|
| | Candida albicans | | Trichophyton interdigitale | | Escherichia coli | | Staphylococcus aureus | |
| | 2 days | 4 days | 5 days | 15 days | 24 hrs | 48 hrs | 24 hrs | 48 hrs |
| Griseofulvin | — | — | 5 | 50 | — | — | — | — |

\* G-11:2,2'-methylene bis(3,4,6-trichlorophenol)
\*\* TMTD:bis(N,N-dimethylthiocarbamoyl)disulfide

EXAMPLE 9

Phenol index of the compounds of this invention were investigated according to the method described in "Saikingaku-Jisshuteiyo" (issued by Denken Gakuyukai) P335. The results are set forth in Table 3.

Table 3.

| Compound No. | Phenol index | |
|---|---|---|
| | Escherichia coli | Staphylococcus aureus |
| I | 450 | 312 |
| II | 114 | 80 |
| III | 227 | 312 |
| IV | 57 | 40 |
| XI | 324 | 264 |
| XII | 238 | 246 |
| XIII | 82 | 51 |
| XIV | 186 | 114 |
| XXI | 440 | 321 |
| XXII | 48 | 212 |
| XXIII | 83 | 318 |
| XXIV | 450 | 308 |
| XXXI | 387 | 220 |
| XXXII | 385 | 335 |
| XXXIII | 131 | 76 |
| XXXIV | 463 | 403 |
| G-11 | 3 | 316 |
| Cyanuric acid chloride | 29 | 20 |

EXAMPLE 10

25 g of compound IV was mixid with 100 g of organic blue pigment, 0.5 g of deodorant (tradename "Chemicalan" 604 D provided by Soda Koryo Co.) and 825 g of starch by means of a ball mill and then an antiseptic composition for human waste or sewage was obtained. 9 g of the composition was added to 500 ml of aqueous pepton solution which contained $3.2 \times 10^{11}$ cells of Escherichia coli per milliliter and agitation was continued for 48 hrs at room temperature. Completing the above agitation, residual survival cells of Escherichia coli in the solution were counted but a surviving rate is almost 0%.

Similar tests were performed with regard to the compounds I, III, XIII, XXIV, XXVI, XXXII and XXXV, and same results were obtained.

EXAMPLE 11

Suspension of the compound I in 25% aqueous solution of gum arabic was compulsorily feeded to six female mice by means of a stomack tube and inspection had been made for 2 weeks. Testing results indicated that LD 50 of the compound was more than 5,000 mg/kg. Further, the compounds II, IX, XIII, XXX and XXXIII also showed more than 5,000 mg/kg of LD 50 value by the similar method and consequently were proved that toxicity of these compounds were also low.

EXAMPLE 12

0.1%, 1% and 10% Concentration of suspension were prepared by suspending compounds I, IX, XIII, XV, XXVI and XXVIII into 5% aqueous solution of gum arabic. Then the above suspensions were dropped on the rabbits' conjunctiva, cornea and skin, and were wiped out after 1 minute. The rabbits were breeded for 2 weeks and inflammation was checked. Even in 10% suspension of the compounds, nothing of inflammation was observed.

EXAMPLE 13

Slime control compositions were prepared by mixing 80% of ethylene glycol, 5% of nonionic surfactant (obtained by trade name of Solpole from Toho Kagaku Co.) and 15% of one of Compound I, XIII, XXI, XXII, XXV and XXX respectively. The composition was added to water stream in the paper manufacturing process so as to keep an ingredient concentration of 5 ppm and complete prevention from breeding of microbe was observed.

EXAMPLE 14

Antibiotic soaps were prepared by mixing the compounds I, III, IX, XIII, XXIII, XXIV, XXIX, XXX and XXXVI with soap at various rate respectively. The test for bacteriocidal activity was performed and the results showed that all of the above compounds have excellent bacteriocidal activity for Escherichia Coli, Staphylococcus aureus, Trichophyton interdigitale, Candida albicana, Proteus vulgaris and Aerobacter aerogenes. Further similar test was also performed with respect to the mixture consisting of 0.5% of the above compound, 1.0% of hexachlorophene (G-11) and toilet soap, and identical results were confirmed.

EXAMPLE 15

Antimicrobial fiber was prepared by treating a cotton with aqueous solution containing a sterilizing composition consisting of 20% of the compound of this invention, 40% of polyethylene glycol alkyl phenol ether and 40% of polyethylene glycol in order to contain about 5 ppm of the compound in the cotton. Then germs and fungi used in Example 14 were inoculated on the moistured cotton and inoculated on the moistured cotton and incubated. This test was performed with respect to compounds I, IX, XXII and XXVII, and excellent effects for prevention from propagation of microbes were confirmed in all compounds.

What is claim is:

1. A germicidal and fungicidal agent represented by the following general formula:

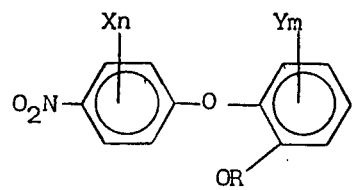

wherein each X represents a halogen atom, selected from the group consisting of chlorine and bromine, and whem m is a plural number Y may represent more than one kind of said halogen atom; R is selected from the group consisting of a hydrogen atom and a sodium atom, n expresses zero to 1, m expresses zero or an integer of not more than 3, and m and n cannot both be zero.

2. A compound according to claim 1 wherein X is chlorine.

3. A compound according to claim 1 wherein n is zero.

4. As a germicidal and fungicidal agent, the following compound:

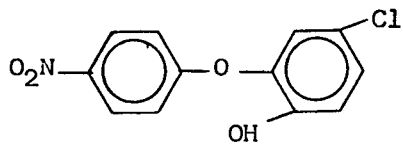

* * * * *